Nov. 8, 1966  P. T. GORMAN  3,283,734

EXTERNALLY INSULATED HULL STRUCTURE

Filed Dec. 28, 1964

INVENTOR
PAUL T. GORMAN

BY
WHELAN, CHASAN, LITTON, MARX & WRIGHT
ATTORNEYS

United States Patent Office 3,283,734
Patented Nov. 8, 1966

3,283,734
EXTERNALLY INSULATED HULL STRUCTURE
Paul T. Gorman, Chatham, N.J., assignor to Esso Research and Engineering Company, a corporation of Delaware
Filed Dec. 28, 1964, Ser. No. 421,545
9 Claims. (Cl. 114—74)

The present invention relates to cargo ships and more particularly to tankers adapted to transport cryogenic cargoes, such as liquefied natural gases at atmospheric pressures.

It has been established that the transportation of gases, such as natural gas, hydrogen, oxygen, methane, and the like, to remote locations, may best and most efficiently be accomplished by reducing the volume of the gas through its conversion into the liquid state. Such a conversion enables the storage volume requirements to be greatly reduced (approximately six-hundredfold for a given quantity of methane gas, for example) and, as should be appreciated, enables the most efficient transfer of the gas to a remote area.

In order to transfer liquefied gas in a practical and economical manner in relatively large volumes, it is necessary to store the liquefied gas at approximately atmospheric pressure, since large containers built to withstand superatmospheric pressures would be impractical, if not impossible, to construct for use on seagoing tankers or the like. However, liquefied gases maintained at atmospheric pressures have extremely low vaporization points, ranging from about −435° F. for liquefied hydrogen, to −28° F. for liquefied ammonia and these unusually low temperatures of the liquids present certain problems in the design and production of tankers for their transportation. Specifically, the tanker cargo space must be capable of preventing heat losses which would lead to subsequent volatilization of the stored liquefied gas and of withstanding the internal stresses that may be induced therein by the large temperature gradient through its walls.

Conventionally, liquefied gases are housed in independent insulated containers or in so-called integrated insulated structures, both of which are installed or constructed within the cargo space of a ship and both of which provide at least two liquid and gas impermeable barriers between the cargo and the conventional mild steel ship structure to safeguard the ship structure from the deleterious embrittling effects of the supercooled cargo.

The present invention represents a novel approach to the marine transportation of cryogenic cargoes and a radical departure from the systems heretofore employed for that purpose. Specifically, in accordance with the invention, a ship cargo tank or container is constructed as an integral part of the midbody of the ship hull structure itself. The tank is made of a material, such as high nickel steel plate, which is capable of withstanding the thermal stresses induced by the supercooling temperatures of the liquefied gas. In other words, the liquefied gas cargoes are stored in direct contact with the ship structure, which is of a nonembrittling material to withstand the thermal stresses induced thereby, rather than being entirely separated from the ship structure by a series of barriers as has been the practice heretofore.

In accordance with the invention and in order to prevent the volatilization of the liquefied gas through heat transfer from the ambient atmosphere, including the sea water adjacent the cargo holds, certain external surfaces of the ship structure itself, specifically the high nickel steel plate employed in the cargo hold portions, are clad with thermal insulation. As a specific aspect of the invention, substantial savings in construction may be realized by cladding the cargo holds externally with the necessary insulation, rather than internally cladding the holds. The external surfaces are significantly more smooth than the internal surfaces which are, in effect, relatively "rough" due to the presence of conventional strengthening ribs, bulkheads, and the like, and the smooth external surfaces may be more easily and more efficiently clad with insulation than the rough or interrupted internal surfaces. As a further important aspect, the externally applied insulation, being an integral part of the external hull structure, is appropriately reinforced or otherwise suitably protected from physical degradation at the points of frequent contact or high wear along the sides and bottom of the ship by separate reinforcement elements.

For a more complete understanding of the invention and its attendant advantages, reference should be made to the following detailed description and the accompanying drawing, in which.

Figure 1:
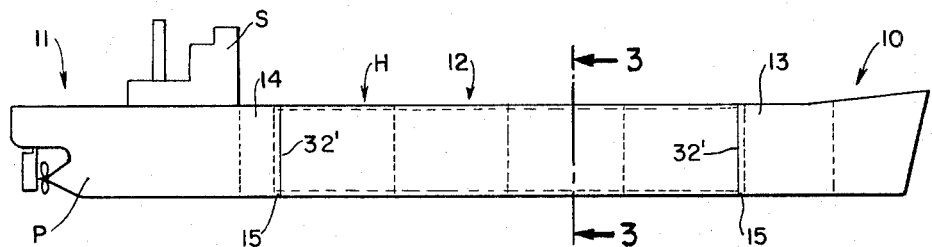
FIG. 1 is a schematic elevational view of the new and improved, externally insulated tanker.

Referring to FIG. 1, a preferred embodiment of the new ship generally includes a hull H, a power plant P, and superstructure S, arranged as shown. The forward hull portions 10 and the after hull portions 11 are conventionally fabricated from mild steel ship plate and mild steel strengthening members. As shown in FIG. 1, the forward and after hull portions each may typically include ballast tanks 13, 14, respectively, and extend to the midbody or cargo carrying hull portions 12 of the ship from which they are separated by cofferdams 15, which are likewise fabricated from conventional, mild steel plate.

Figure 2:
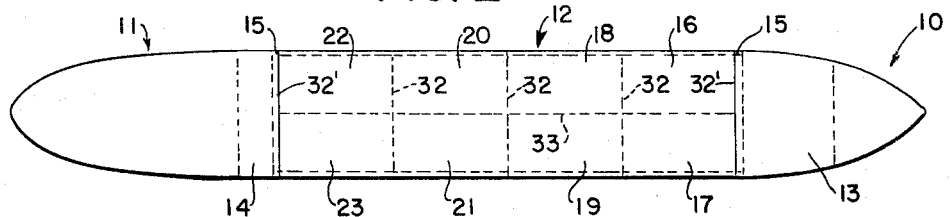
FIG. 2 is a schematic plan view of the new tanker.

In accordance with an important specific aspect of the invention, the midbody 12 of the ship is fabricated from metal plate which is capable of withstanding the thermal stresses induced by liquefied gases. Advantageously, the midbody plate material is a nickel steel plate containing about nine percent nickel. As a further specific aspect of the invention, the exterior of the cargo hold portions 12, which as shown in FIG. 2 may be subdivided into several individual cargo holds 16–23 by transverse bulkheads 32 and a longitudinal bulkhead 33, are completely enveloped or clad externally with thermal insulation material 24. The externally attached insulation may be applied to the hull and to the forwardmost and aftermost transverse bulkheads 31 with relative simplicity and great efficiency by spraying, for example. A foamed polyurethane 27 or like material is a suitable insulating material for the purposes of the invention and, when employed, may itself be protected by a superimposed sprayed coating 28 of a polyester resin reinforced by chopped strands of fiberglass (FIG.

4). As will be appreciated, the inventive concept of externally applying thermal insulation to a cryogenic cargo-resistant hull structure provides advantageous savings of labor and effort, since the application of the insulation exteriorly to the relatively smooth outer surfaces of the hull H is significantly more simplified than applying insulation to the comparatively rough interior surfaces of the hull, which are reinforced by longitudinal and transverse ribs 25, 26, respectively.

Figure 3:
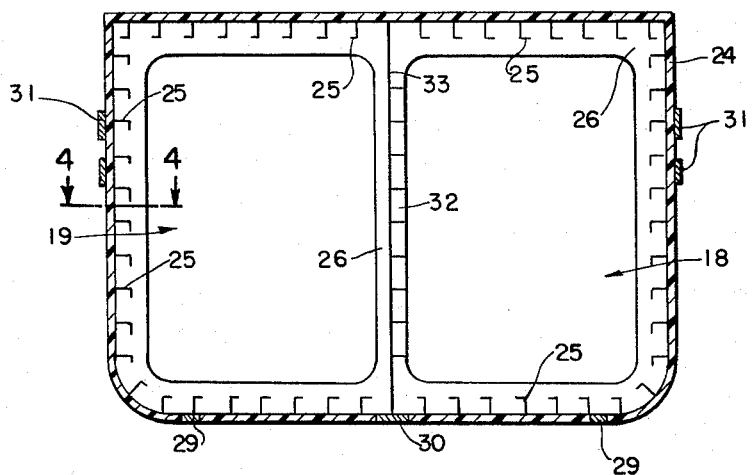
FIG. 3 is an enlarged, cross-sectional view of the new and improved cargo holds of the tanker of the invention taken along lines 3—3 of FIG. 1.
Figure 4:
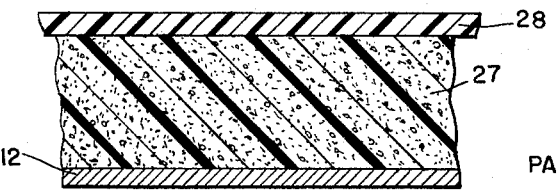
FIG. 4 is an enlarged, cross-sectional view taken along line 4—4 of FIG. 3 showing details of the hull construction.

The external thermal insulation may have its useful life significantly extended, and it may be made more effectively wear-resistant by the inclusion therewith of high strength plastic reinforcements at points of vulnerability to abrasion and the like. To that end and as shown in FIG. 3, plastic bilge blocks 29 and a plastic keel block 30 are embedded in the insulation 24 at the underside of the hull. The insulation 24 at the sides of the hull is similarly protected by protruding plastic or metal rubbing rails 31 suitably affixed thereto. Alternatively, the entire external insulation, itself, may be covered by a complete shell of high strength material.

In the illustrated preferred embodiment, the overall molded hull form may be of the following representative dimensions: length between forward and aft perpendiculars, about 630 feet; beam amidships, about 86 feet; and depth, about 60 feet. Internally of the hull, the eight cargo holds may each be about 80 feet in length and about 43 feet in width; the cofferdams may each be about 5 feet in length; the forward ballast tank may be about 65 feet in length; and the aft ballast tank about 25 feet in length.

As indicated in FIGS. 1 and 2, the configuration of the ship's midbody 12 advantageously provides for sufficient dimensional constriction of width and depth to accommodate the externally clad insulation while maintaining the lines of the ship relatively smooth and uniform. The fore and aft sections of the hull have width and depth dimensions corresponding to the dimensions of the exterior of the insulation embracing the constricted midbody.

It will be appreciated that a new and improved tanker construction embodying the inventive concepts enjoys significant construction advantages over conventional structures, since the cryogenic, liquefied natural gas cargo is carried directly by the ship structure, itself, rather than being separated therefrom by a plurality of barriers, independent tanks, and thermal insulation. Further, as should be understood, significant savings are effected through the application of thermal insulation to the relatively smooth exterior surfaces of the ship hull rather than to internal surfaces, which are interrupted by reinforcing ribs, pipe mountings, etc.

It should be understood that the specific structure means herein illustrated and described is intended to be representative only, as certain changes may be made therein without departing from the clear teachings of the disclosure. Accordingly, reference should be made to the following appended claims in determining the full scope of the invention.

What is claimed is:

1. A tanker for the transportation of liquefied natural gas or the like at atmospheric pressure and cryogenic temperature comprising
    (a) a ship hull having forward portions, after portions, and intermediate cargo carrying portions,
    (b) transverse cofferdams included in forward and after portions separating the same from said cargo carrying portions,
    (c) transverse and longitudinal bulkheads included in said intermediate portions and defining therewith a plurality of cargo holds,
    (d) said forward and after portions being fabricated from mild steel plate,
    (e) said cargo holds being fabricated from plate material having strength and thermal properties at extremely low temperatures characteristic of nine percent nickel steel, and
    (f) thermal insulation means clad to the outer surfaces of said intermedite hull portions and interposed between said cargo holds and said cofferdams.

2. A tanker in accordance with claim 1, in which
    (a) said insulation means comprises polyurethane foam, and
    (b) insulation protection means comprising a fiberglass reinforced polyester is applied over said foam.

3. A tanker in accordance with claim 2, in which
    (a) plastic reinforcing means are embedded in said insulation means at the underside of said hull, and
    (b) rubbing bars are superimposed on said insulation means at the sides of said hull.

4. A tanker whose hull is comprised of forward, after portions and intermediate cargo-carrying portions
    (a) thermal insulation means applied externally of the portion of said hull formed by said intermediate cargo carrying portions,
    (b) said forward and after hull portions comprising mild steel plate,
    (c) said intermediate cargo-carrying portions of said hull comprising metal plate having low temperature thermal and strength properties characteristic of nine percent nickel steel.

5. A tanker in accordance with claim 4, in which
    (a) said insulation means comprises polyurethane foam and an enveloping protective coating of fiberglass reinforced polyester resin.

6. A tanker in accordance with claim 4, in which
    (a) said insulation means includes plastic reinforcing members at the bottom and sides of said hull.

7. A ship cargo hold for storing and transporting liquefied gases at cryogenic temperatures and atmospheric pressure including
    (a) a hold portion of steel plate walls having low temperature strength and thermal properties characteristic of nine percent nickel steel, wherein some of said walls form a portion of the exterior hull of said ship,
    (b) transverse and longitudinal bulkeads of plate having low temperature strength and thermal properties characteristic of nine percent nickel plate cooperating with said hold portions to define a closed cargo space,
    (c) strengthening members having low temperature strength and thermal properties characteristic of nine percent nickel steel, reinforcing said cargo hold at the internal surfaces thereof,
    (d) the external surfaces of said cargo hold being relatively smooth in comparison with said internal surfaces,
    (e) thermal insulation means applied to said external smooth surfaces.

8. A tanker for the transportation of liquefied natural gas or the like at atmospheric pressure and cryogenic temperature comprising
    (a) a cargo hold portion according to claim 7,
    (b) forward and after hull portions joined to said hold portion, and
    (c) cofferdams separating said hold portion from said forward and after portions,
    (d) the external width and depth dimensions of said thermal insulation corresponding to the external width and depth dimensions of said forward and after hull portions.

9. A tanker for the transportation of liquefied natural gas or the like at atmospheric pressure and cyrogenic temperature comprising
    (a) a ship hull having a forward portion, an after portion, and an intermediate cargo-carrying portion,
    (b) said cargo-carrying portion being fabricated from plate material having strength and thermal properties at extremely low temperatures characteristic of nine percent nickel steel, and (c) thermal insulation means clad to the outer surfaces of said intermediate cargo-carrying hull portion and extending between said intermediate portion and said forward and after portions.

References Cited by the Examiner

UNITED STATES PATENTS

| | | | |
|---|---|---|---|
| 2,986,011 | 5/1961 | Murphy | 65—55 |
| 3,010,599 | 11/1961 | Haines et al. | 220—9 |
| 3,092,063 | 6/1963 | Leroux | 114—74 |

FOREIGN PATENTS 1,330,876  5/1963  France.

MILTON BUCHLER, *Primary Examiner.*

T. M. BLIX, *Assistant Examiner.*